United States Patent Office 3,175,649
Patented Mar. 30, 1965

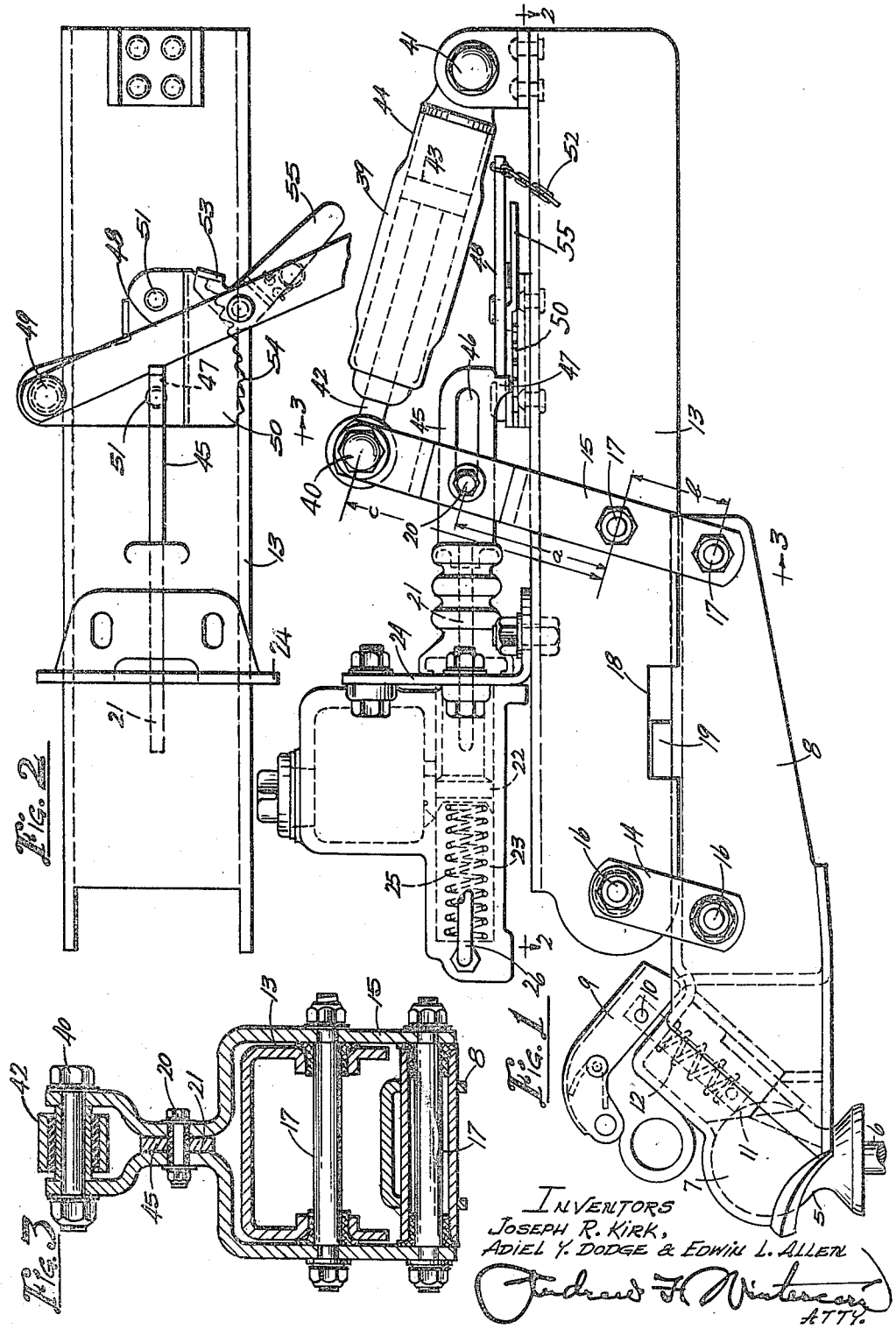

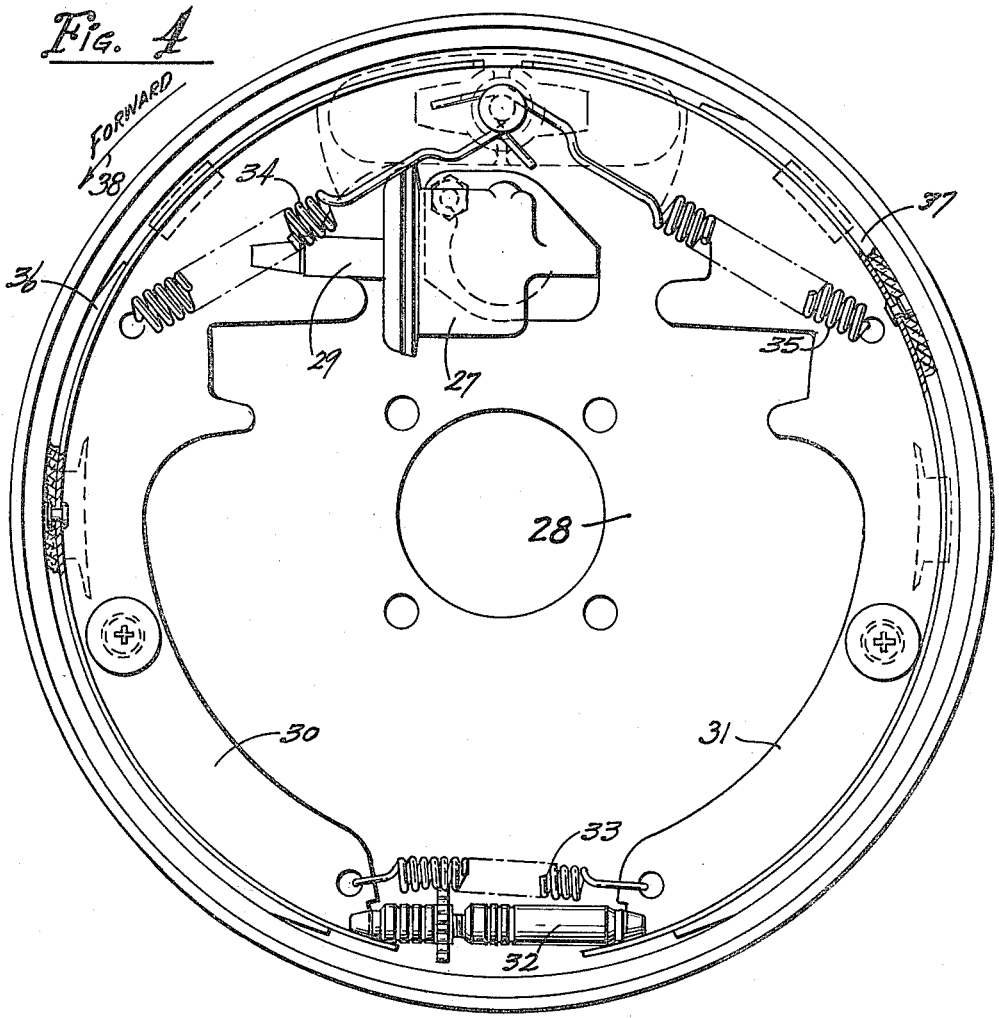

3,175,649
TRAILER BRAKE ACTUATOR
Joseph R. Kirk, Adiel Y. Dodge, and Edwin L. Allen, Rockford, Ill., assignors to Atwood Vacuum Machine Company, Rockford, Ill., a corporation of Illinois
Filed Oct. 30, 1961, Ser. No. 148,576
6 Claims. (Cl. 188—112)

This invention relates to a new and improved trailer brake actuator, especially designed to eliminate premature locking of the trailer brakes and uncontrollable skidding of the trailer wheels when the brakes are applied, that being due, in our opinion, partly to poor timing in the application of the brakes on the trailer and partly to over-braking on the trailer.

It is, therefore, the principal object of our invention to provide a novel brake actuating mechanism in which a shock absorber or dash-pot means is incorporated to improve the timing of the trailer brakes, and in which there is no longer the usual one-to-one ratio of trailer braking to car braking, but the trailer brakes as a result of a new ratio of operating leverage employed are applied approximately one-third softer, and the shock absorber or dash-pot means is operated through a longer distance than the brake operating piston, by virtue of the new ratio of operating leverage employed, in order to avoid skidding of the wheels on the trailer and achieve steady skid-free braking action.

Another feature of our invention is the use of single piston type internal-expanding brakes on the trailer wheels, which besides giving a highly desirable wrapping or servo action in the application of the brakes when moving forward for the desired smoother and softer brake application on the trailer wheels, gives the further advantage that with that type of brakes, the braking action in backing up is so small, due to unwrapping, approximately 15% of what is obtainable in forward travel, that we have found it unnecessary to provide the usual complicated mechanism for automatically disconnecting the trailer brakes in backing up, and we believe that, everything considered, it is safer and more practical to have the reduced braking action effective during backing up, and, the elimination of the additional complications to provide for automatic deenergization of the brakes in backing up means not only a saving in the overall cost of the trailer brake actuator, but, in the long run, assures more dependable braking in forward travel, as there is always a danger with such automatic devices of a failure, which could mean that the trailer brakes would fail to function properly in forward travel in an emergency.

The invention is illustrated in the accompanying drawings, in which:

FIG. 1 is a side view of a trailer hitch equipped with brake actuating mechanism made in accordance with our invention;

FIG. 2 is a plan view on the line 2—2 of FIG. 1;

FIG. 3 is a section on the line 3—3 of FIG. 1, and

FIG. 4 is a view of the inside of one of the trailer brake drums showing the single piston type internal-expanding brakes employed on the trailer in accordance with our invention which makes for such greatly reduced braking action in backing up that automatic disconnection of the trailer brakes is rendered unnecessary.

The same reference numerals are applied to corresponding parts throughout these views.

Referring to the drawings, and particularly FIGS. 1, 2 and 3, the reference numeral 5 designates a ballhead that is usually mounted by means of an attaching shank 6 to a rear portion of the automobile or other towing vehicle, and 7 designates a socket provided on the front end portion of an elongated sheet metal channel member 8 attached to the front end of the trailer to be hauled by the towing vehicle. The ballhead 5 is adapted to be entered detachably in the socket 7 for swivel connection of the car with the trailer, and the ballhead can be locked securely in place in said socket to eliminate any likelihood of accidental uncoupling of the trailer, as by suitably locking the lever 9 against pivotal movement about the pin 10 by means of which the lever 9 is adapted to retract the concave ball-retaining shoe 11 against the action of its coiled compression spring 12. An elongated sheet metal channel 13 carried on and rigid with the front end of the trailer is wider than channel 8 and disposed above and in centered aligned relationship to the channel 8 as seen in FIG. 3, and has a lost-motion pivotal connection with said channel member by means of two pairs of links 14 and 15, the links 14 being pivotally attached to the opposite ends of bolts 16 mounted in the two channel members similarly as the two bolts 17 by means of which the two links 15 are connected, as shown in FIG. 3. Elongated notches 18 in the opposite side walls of the channel 13 normally have abutment at their front ends with the opposite ends of a cross-bar 19 fixed to the top of channel 8 to transmit forward pull to the trailer from the towing vehicle, but, when the towing vehicle slows up or stops, channel 13 moves forwardly relative to channel 8 on links 14 and 15, the links 15, in their forward oscillation, transmitting forward movement through a cross-bolt 20 to a piston rod 21 to operate the piston 22 in the master brake cylinder 23 that is mounted by means of bracket 24 on top of channel 13. The piston 22 moves forwardly against the resistance of a coiled compression spring 25 and discharges oil from the cylinder under pressure through a pair of tubes 26 that is connected to the opposite sides of and communicate with the master brake cylinder 23 and serve to conduct the oil to a pair of single piston type cylinders 27 provided on the brake drums 28 on the two trailer wheels to operate the pistons 29 in these cylinders simultaneously.

The opposed internal-expanding type brake shoes 30 and 31 in each of said assemblies have the usual adjustable link connection 32 and retracting springs 33, 34 and 35 and, by reason of the shorter lining 36 on the shoe 30, as compared with the longer lining 37 on the other shoe 31, the brake when applied is adapted to operate with a wrapping or self-energizing action in the normal forward rotation of the trailer wheel, indicated by the arrow 38, to give a nice smooth but dependable braking action in the forward direction, but a greatly reduced or de-energizing braking action in a rearward direction, even though similar braking pressure is applied by means of pistons 29, the braking effect in rearward motion being actually only about 15% of what is obtained in forward motion. As a result, we have found it entirely practical to dispense with automatic means for rendering the brakes inoperable in rearward motion, and by so doing we have gained the following worthwhile advantages:

(1) Elimination of this automatic feature means an appreciable saving in the overall cost of the trailer brake actuating mechanism;

(2) Elimination of this automatic feature makes the trailer brake mechanism simpler and more reliable;

(3) Elimination of this automatic feature makes forward braking safer by reason of the brake actuating mechanism being never disconnected for backing up, and (4) We provide trailer brakes that give diminished braking action automatically in backing up, independently of actuation of the car brakes, and this combination is safer than where stopping in backing up depends entirely upon whatever braking effect is obtainable with the brakes on the car.

Attention is now called to the fact that the dimension *a* from the upper pivot bolt 17 to bolt 20 is approximately 50% larger than the dimension *b* between the upper and lower bolts 17, whereas in prior trailer brake actuators the ratio was almost invariably 1 to 1. As a result, we obtain approximately one-third softer braking action on the trailer wheels. More specifically, it greatly reduces any tendency for the trailer brakes to grab and skid the wheels. Trailer braking that is just enough softer than the braking on the towing vehicle to avoid skidding is preferable because it is generally more certain to bring a trailer to a halt in a shorter distance, besides being much easier on the tires and the road. Jack-knifing is also less likely with our improved braking.

Coupled with the softer braking action, and an important element in the present new combination, is the increased stroke given the piston 43 in shock absorber 39 in relation to the stroke given the brake piston 22, as is evident from a comparison of dimension *c* with dimensions *a*, *c* equalling nearly twice *a*. The shock absorber 39 is pivotally connected between the outer end of links 15 well beyond the point 20% their connection with piston 22, as at 40, and the rear end of channel 13, as at 41, the rod 42 of shock absorber piston 43 being attached to the bolt 40, and shock absorber cylinder 44 being attached to the bolt 41. This shock absorber is of the well-known Gabriel type having a valve mechanism incorporated in the piston 43, as in Patent 2,507,267, affording approximately the same resistance to fluid flow with the piston moving in either direction, whereby to give improved timing in the application of the brakes on the trailer, namely, delaying as well as slowing the application of the brakes so that the trailer brakes are applied an instant later than towing vehicle's brakes and not as hard. As a result, there is much less likelihood of jack-knifing which is caused usually by the trailer brakes being applied too soon and too hard, causing the trailer wheels to skid, and the trailer, not being slowed down properly in relation to the slowing of the towing vehicle, jack-knifes unless the driver is fortunate enough to keep the trailer and towing vehicle in exact alignment during the slow-up. Summing up, we obtain by virtue of the magnitude of dimension *c* relative to dimension *a*: (1) faster and longer travel of piston 43 in relation to piston 22, and, consequently, (2) enough increase in fluid flow in shock absorber 39 in relation to fluid flow from brake cylinder 23 to obtain a better damping action and finer control of the trailer braking action with relation to the braking action on the towing vehicle.

The slotted extension 45 of the piston rod 21, through the slot 46 in which the bolt 20 extends for the lost-motion connection with the rod 21, has a downward projection 47 on its rear end for abutment by a lever 48 pivoted at 49 with respect to a segmental-shaped ratchet plate 50 that is riveted, as at 51, to the top of the channel 13, the lever 48 having one end of a chain 52 connected to its outer end and the other end connected to the towing vehicle, with a predetermined amount of slack in the chain, so that the lever 48 will not be oscillated at any time during normal towing of the trailer behind the car, but, in the event of accidental uncoupling of the ballhead 5 from socket 7, the chain 52 will be stretched taut and thereby oscillate the lever 48 and apply the brakes on the trailer before the chain 52 is broken as a result of the overload on it. The lever 48 carries a spring-pressed pawl 53 which engages the ratchet teeth 54 on plate 50, that are provided in an arc with the pivot 49 as a center, the pawl serving to lock the lever 48 in its brake-applying position until the pawl is released by operation of its handle end 55.

It is believed the foregoing description conveys a good understanding of the objects and advantages of our invention. The appended claims have been drawn to cover all legitimate modifications and adaptations.

We claim:
1. A device of the class described comprising a coupler member attached to a brake equipped towing vehicle, a draft member attached to a hydraulic brake equipped trailer vehicle the brakes of which are operable independently of the brakes on the towing vehicle, means including oscillatable links pivotally connected at their opposite ends to said coupler and draft members providing a lost motion draft connection between said members permitting forward movement of the draft member relative to the coupler member, one of said links having an extension, and a trailer brake operator operatively connected with said extensions, whereby it is operated with less than one to one mechanical advantage in response to relative endwise motion between said members incident to application of the brakes on the towing vehicle, said brake operator being connected to the trailer brakes to operate the same accordingly with softened braking action.

2. A device as set forth in claim 1, including dash-pot means connected between the coupler and draft members so as to be operated through a longer stroke than the relative movement allowed by the lost-motion draft connection, the same operating upon relative movement between said members in either direction, whereby to retard application and release of the trailer brakes, said dash-pot means operating with substantially equal resistance to movement in both directions.

3. A device as set forth in claim 1 including dash-pot means connected with an extension of the aforesaid link extension so as to be operated through a longer stroke than the brake operator in both directions to restrain its movement in a brake applying direction and also in a brake releasing direction and accordingly restraining lost-motion between said coupler and draft members in either direction and retarding both the application of the trailer brakes and the release thereof, said dash-pot means operating with substantially equal resistance to movement in either direction.

4. A device as set forth in claim 1, wherein the trailer brakes are permanently operatively connected with said operator permitting their operation in backing up, said trailer brakes being self-energizing when applied in a forward direction and de-energizing when applied in the reverse direction to give appreciably reduced braking action in backing up.

5. A device as set forth in claim 1 wherein the trailer brake operator's connection with said extension is a lost-motion connection permitting the trailer brake operator to be operated independently of movement of said extension, there being means operable by a break-away connection with the towing vehicle to operate the brake operator to operate the trailer brakes in the event of disconnection of the coupler member from the draft member.

6. A device as set forth in claim 1 wherein the trailer brake operator's connection with said extension is a lost-motion connection permitting the trailer brake operator to be operated independently of movement of said extension, there being means operable by a break-away connection with the towing vehicle to operate the brake operator to operate the trailer brakes in the event of disconnection of the coupler member from the draft member, and releasable means for locking the last mentioned means in brake applying position.

References Cited by the Examiner
UNITED STATES PATENTS

| | | | |
|---|---|---|---|
| 1,922,719 | 8/33 | Townsend | 188—112 |
| 2,113,262 | 4/38 | Zagelmeyer | 188—112 |
| 2,320,585 | 6/43 | Gill | 188—112 |

(Other references on following page)

UNITED STATES PATENTS

| | | | |
|---|---|---|---|
| 2,508,493 | 5/50 | Cook | 188—112 |
| 2,648,407 | 8/53 | Schwertner | 188—112 |
| 2,834,437 | 5/58 | Davids | 188—112 |
| 2,846,030 | 8/58 | Wade | 188—112 |
| 2,916,107 | 12/59 | Huentelman | 188—112 |
| 2,954,104 | 9/60 | Shumate | 188—112 |
| 2,973,839 | 3/61 | De Puydt et al. | 188—112 |
| 3,007,552 | 11/61 | Eksergian | 118—112 |
| 3,073,419 | 1/63 | Henry | 118—112 |

FOREIGN PATENTS

| | | |
|---|---|---|
| 1,115,222 | 12/55 | France. |
| 1,204,245 | 8/59 | France. |

ARTHUR L. LA POINT, *Primary Examiner.*

A. JOSEPH GREENBERG, *Examiner.*